United States Patent
Grivna

(10) Patent No.: US 8,624,845 B2
(45) Date of Patent: Jan. 7, 2014

(54) CAPACITANCE TOUCH SCREEN

(75) Inventor: Edward L. Grivna, Brooklyn Park, MN (US)

(73) Assignee: Cypress Semiconductor Corporation, San Jose, CA (US)

( * ) Notice: Subject to any disclaimer, the term of this patent is extended or adjusted under 35 U.S.C. 154(b) by 798 days.

(21) Appl. No.: 12/239,610

(22) Filed: Sep. 26, 2008

(65) Prior Publication Data

US 2010/0079384 A1    Apr. 1, 2010

(51) Int. Cl.
  *G06F 3/041* (2006.01)
  *G09G 3/36* (2006.01)

(52) U.S. Cl.
  USPC .......................................... 345/173; 345/104

(58) Field of Classification Search
  USPC .......................................................... 345/173
  See application file for complete search history.

(56) References Cited

U.S. PATENT DOCUMENTS

| | | | |
|---|---|---|---|
| 5,867,151 A * | 2/1999 | Nakai | 345/173 |
| 6,188,391 B1 * | 2/2001 | Seely et al. | 345/173 |
| 6,353,434 B1 * | 3/2002 | Akebi et al. | 345/173 |
| 6,686,909 B1 * | 2/2004 | Endo | 345/173 |
| 6,813,957 B1 * | 11/2004 | Platz | 73/780 |
| 8,405,822 B2 | 3/2013 | Grivna | |
| 2004/0041842 A1 * | 3/2004 | Lippincott | 345/783 |
| 2005/0030048 A1 | 2/2005 | Bolender et al. | |
| 2005/0259082 A1 * | 11/2005 | Potsch | 345/173 |
| 2006/0097991 A1 * | 5/2006 | Hotelling et al. | 345/173 |
| 2007/0063983 A1 * | 3/2007 | Huang et al. | 345/173 |
| 2007/0128905 A1 * | 6/2007 | Speakman | 439/161 |
| 2007/0279395 A1 * | 12/2007 | Philipp et al. | 345/173 |
| 2008/0062148 A1 * | 3/2008 | Hotelling et al. | 345/174 |
| 2008/0264699 A1 * | 10/2008 | Chang et al. | 178/18.01 |
| 2009/0091551 A1 * | 4/2009 | Hotelling et al. | 345/174 |
| 2009/0273577 A1 * | 11/2009 | Chen et al. | 345/174 |

OTHER PUBLICATIONS

USPTO Notice of Allowance to U.S. Appl. No. 12/321,661 dated Jan. 3, 2013; 7 pages.
USPTO Pre-Interview First Office Action for U.S. Appl. No. 12/321,661 dated Nov. 21, 2012, 2 pages.

\* cited by examiner

*Primary Examiner* — Alexander S Beck
*Assistant Examiner* — Kirk Hermann

(57) ABSTRACT

A touch screen is described. The touch screen is configured to have an array of conductive, optically transmissive sensor elements coupled to sensor circuitry. The sensor elements are disposed over a display to have a single layer of conductive, optically transmissive material positioned over pixels of the display.

16 Claims, 7 Drawing Sheets

CAPACITANCE TOUCH SCREEN

This application claims the benefit of U.S. provisional patent application Ser. No. 61/022,880 filed on Jan. 23, 2008.

TECHNICAL FIELD

The invention is in the field of capacitive sensing devices and, in particular, touch screens.

BACKGROUND

Computing devices, such as notebook computers, mobile communication devices, and portable entertainment devices (such as handheld video game devices, multimedia players, and the like) have user-interface devices that facilitate interaction between the user and the computing device. One type of user-interface device that has become common is a touch-sensor pad (also known as a "touchpad"). A touchpad replicates mouse X/Y movement by using two defined axes, which contain a collection of sensor elements that detect the position of a conductive object such as a finger. Mouse right/left button clicks can be replicated by electromechanical switches, located in the vicinity of the touchpad, or by tapping commands on the touchpad itself. The touchpad provides a user-interface device for performing such functions as positioning a cursor and selecting an item on a display.

One type of touchpad operates by way of capacitance sensing utilizing capacitance sensors. The capacitance detected by a capacitance sensor changes as a function of the proximity of a conductive object to the sensor. The conductive object can be, for example, a stylus or a user's finger. In a touch-sensor device, a change in capacitance detected by each sensor in the X and Y dimensions of the sensor array, due to the proximity or movement of a conductive object, can be measured by a variety of methods, such as with self-capacitance or mutual-capacitance sensing techniques. Regardless of the method, usually an electrical signal representative of the capacitance detected by each capacitance sensor is processed by a processing device, which in turn converts these electrical signals into numeric values representative of the position of the conductive object in relation to the touch-sensor pad in the X and Y dimensions. A transparent touch screen, touch-sensor strip, slider, or button operates on the same capacitance-sensing principle.

BRIEF DESCRIPTION OF THE DRAWINGS

The present disclosure is illustrated by way of example, and not by way of limitation, in the figures of the accompanying drawings and in which.

DETAILED DESCRIPTION

Figure 1:
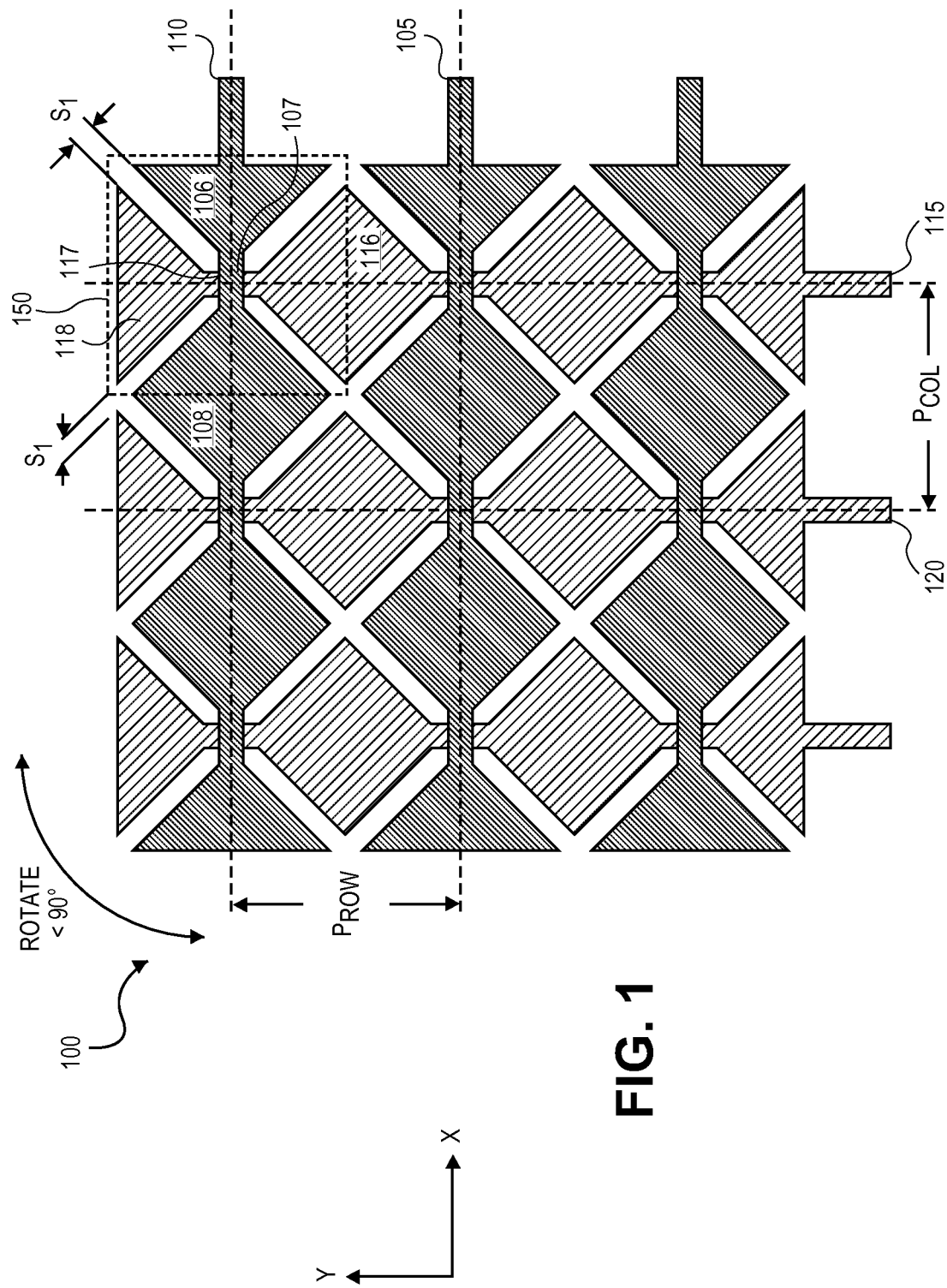
FIG. 1 illustrates a plan view of a capacitance sensor array according to an embodiment.

A touch screen is described herein. The touch screen is configured to have an array of conductive, optically transmissive sensor elements coupled to sensor circuitry. The sensor elements are disposed over a display to have a single layer of conductive, optically transmissive material positioned over substantially all of the pixels of the display to provide a more consistent light path for the entire display. The array of sensor elements may be configured with at least a sensor row axis and a sensor column axis, both axes rotated or skewed from a pixel row axis and pixel column axis of the display.

In the following description, numerous specific details are set forth, such as specific sensor element shapes, in order to provide a thorough understanding of embodiments of the present invention. However, it will be apparent to one skilled in the art that embodiments of the present invention may be practiced without adhering to these specific details. In other instances, well-known aspects of capacitance sensor array assembly, such as layer lamination operations and capacitance sensing circuitry topologies, are not described in detail in order to not unnecessarily obscure embodiments of the present invention. Furthermore, it is to be understood that the various embodiments shown in the figures are illustrative representations and are not necessarily drawn to scale.

The appearances of the phrase "in an embodiment" in various places throughout this specification are not necessarily referring to the same embodiment of the invention. Furthermore, the particular features, structures, materials, or characteristics may be combined in any suitable manner in one or more embodiments. It should also be understood that specific embodiments may be combined where not mutually exclusive.

The terms "over," "under," "between," and "on" as used herein refer to a relative position of one member with respect to other members. As such, for example, one member disposed over or under another member may be directly in contact with the other member or may have one or more intervening members. Moreover, one member disposed between members may be directly in contact with the two members or may have one or more intervening members. In contrast, a first member "on" a second member is in contact with that second member. Additionally, the relative position of one member with respect to other members is provided assuming operations are performed relative to a substrate without consideration of the absolute orientation of the substrate.

In an embodiment, a touch screen includes capacitance sensor elements disposed over a display such that a single layer of optically transmissive conductive material is positioned over substantially all of the pixels of the display. This may provide a consistent light path for an entire display screen or provide a single light path, for uniform transmission, across the entire display screen. Artifacts resulting from multiple light paths with multiple levels of attenuation, variations in refractive index, etc. may be greatly reduced or even eliminated. The single layer of optically transmissive conductive material may eliminate difficult alignment operations typical for touch screen assemblies including multiple sensor layers.

A plan view of an exemplary capacitance sensor array 100 is depicted in FIG. 1. A first substrate contains the column sensor elements 116 and 118 electrically coupled to each other by a column interconnect 117 and further coupled to a column I/O 115 to form a column oriented along the Y-axis. This first substrate is aligned to a second substrate containing row sensor elements 106 and 108 electrically coupled to each other by a row interconnect 107 and further coupled to a row I/O 110 to form a row oriented along the X-axis. The aligned substrates may be bonded to one another by an insulator on the order of 200 micrometer (μm) thick, to form a laminate. It should be noted that in the field of capacitive touch screens, the term "layer" is generally used to refer to a side of a non-conductive substrate upon which transparent conductive material is disposed. As depicted, the primary sensor elements are rhombus shaped and overlap only at the vertices along a row or column to limit the parasitic capacitance ($C_p$) caused by the overlap of the first and second layer.

Figure 2:
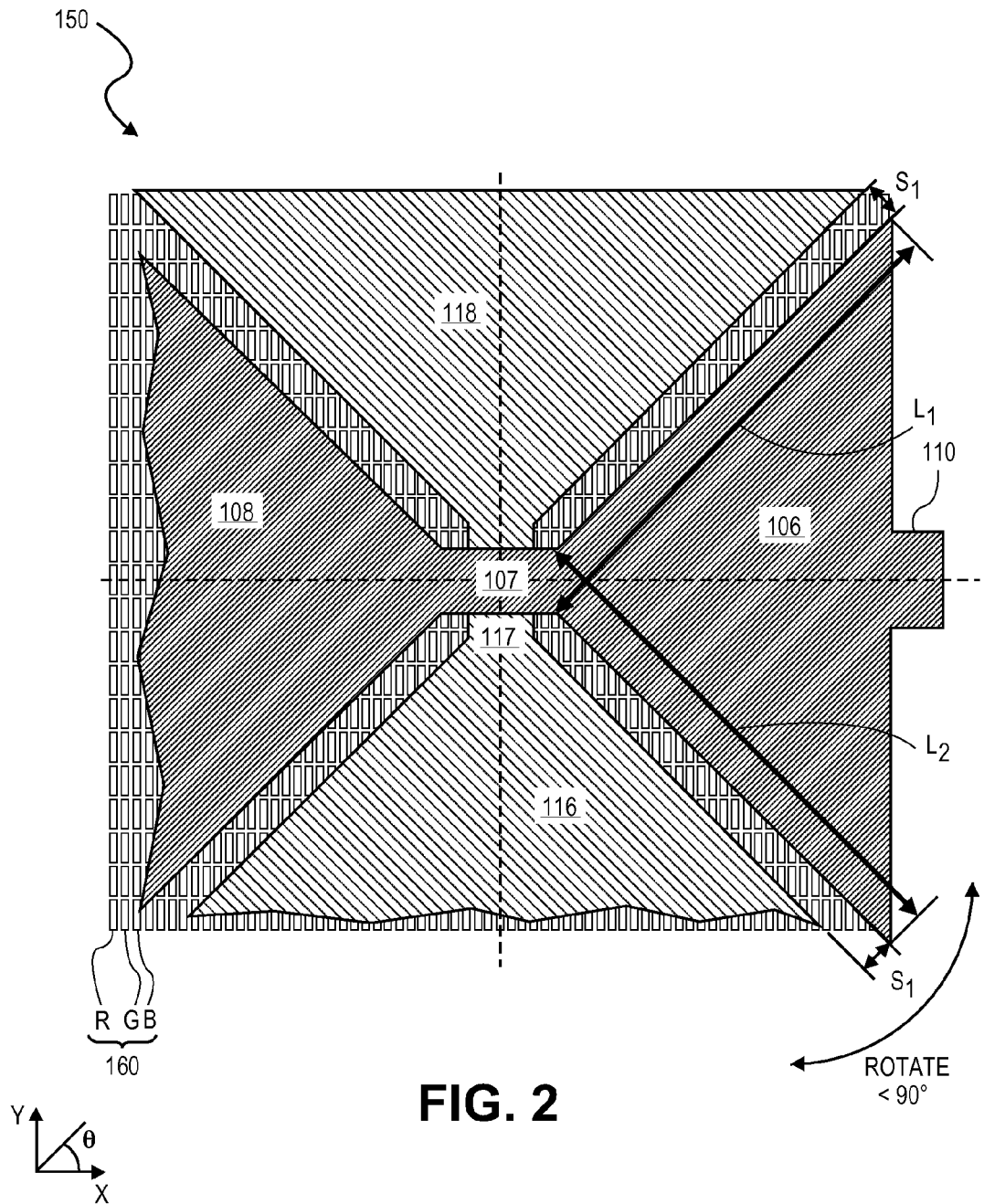
FIG. 2 illustrates a plan view of a portion of the capacitance sensor array of FIG. 1 assembled to overlay an LCD display according to an embodiment.

In an embodiment, the capacitance sensor array 100 is rotated in the directions indicated by the arrows depicted in FIGS. 1 and 2, so that the row and column axes of the array are skewed from the pixel row and pixel column axes of a display. For example, the nominally orthogonal row and column axes of the sensor array may be rotated by an amount less than 90 degrees so as to orient an edge of the capacitance sensor to be substantially parallel with the edges of pixels (or subpixels) rather than coincident with the columns and rows of pixels creating the display. As discussed in further detail elsewhere herein, the sensor elements may also be modified from diamond or rhombus shape to rectangular.

FIG. 2 depicts an expanded view of a portion 150 of the capacitance sensor array 100 overlaying RGB pixels 160 of a liquid crystal display (LCD). To form a projected capacitance touch screen, a capacitance sensor array is positioned over a display. While the capacitance sensor array for touch screens is generally made of a non-opaque conductive material, the conductive material may not be completely transparent and different combinations of material in the light path may cause image artifacts across the viewable area of the display screen, as depicted in FIG. 2. In an embodiment, the row corresponding to sensor elements 106, 108, row I/O 110 and row interconnect 107 is to be skewed by a rotation angle with respect to the X-axis of the display (i.e., display horizontal row dimension) while the column corresponding to the sensor elements 116, 118 and column interconnect 117 is to be skewed with respect to the Y-axis of the display (i.e., display vertical column dimension). Therefore, with rhombus shaped sensor elements as depicted in FIG. 2, the edges having lengths $L_1$ and $L_2$ of sensor element 106 are to be oriented in directions parallel to the display vertical and horizontal rather than extending θ (−θ) off the display horizontal.

In a further embodiment, in a touch screen, a capacitance sensor array is oriented to a display so that the spaces between adjacent sensor elements are disposed between, but not overlapping, the light emitting portions of pixels (or subpixels) of the display. In one implementation, the sensor elements have dimensions that are a multiple of the pixel-pitch of the display. In a further embodiment, a space between an edge of a first sensor element in a row dimension of the array, and adjacent to an edge of a second sensor element in a column dimension of the array, has a width less than or equal to a pixel-mask width of the display. Such dimensions may be achieved by utilizing a single layer of conductive material (i.e., a single-substrate process). In one particular implementation, all the sensor elements are coupled together to form a plurality of rows disposed along one axis and a plurality of columns disposed along a second axis where the number of sensor elements in each row or column are not uniform.

Other embodiments include a method implemented by a computer, microcontroller, microprocessor, or similar for determining a location of a touch on a touch screen by performing a rotational transform of one or more coordinates of a capacitance sensor array representing a location of a sensed touch. The rotational transform may be based on the orientation of the display screen relative to the orientation of the capacitance sensor array to determine one or more coordinates of the display screen corresponding to the sensed touch, as discussed in further detail elsewhere herein.

Figure 3A:
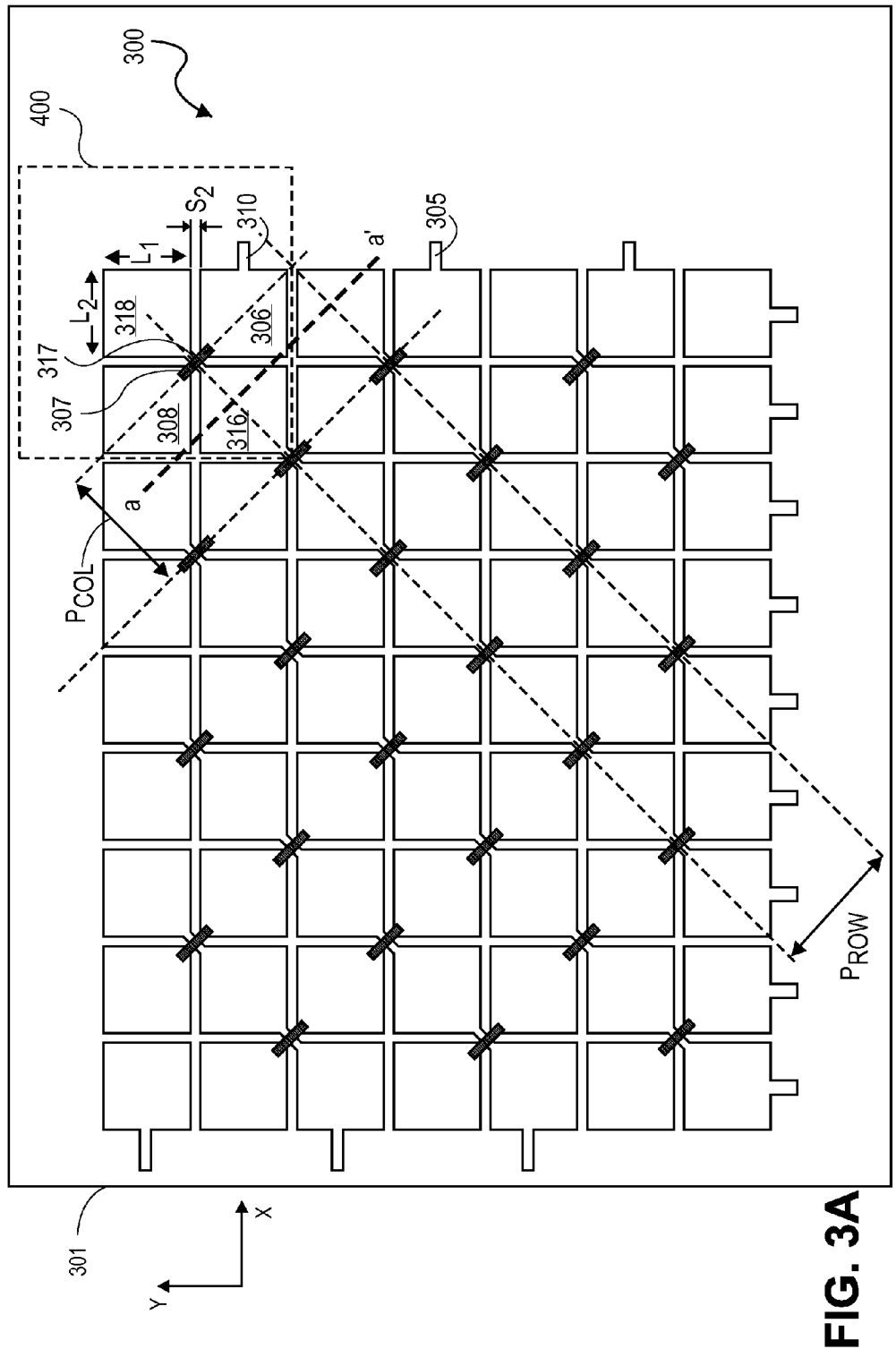
FIG. 3A illustrates a plan view of a capacitance sensor array, in accordance with an embodiment of the present invention.

An embodiment employing a same, single-layer of optically transmissive conductive material for each sensor of a capacitive sensor array is depicted in FIG. 3A. Using a single layer of transmissive conductive material (e.g., ITO) may allow a reduction in the various dimensions and tolerances of the sensor array. Use of a single layer of transmissive conductive material for each sensor of the sensor array may also avoid a potential non-uniformity between transparent conductive coatings applied to a first and second substrate which might lead to a difference in light transmission.

As shown in FIG. 3A, a plurality of capacitance sensor elements is configured into a sensor array 300. Sensor array 300 is two-dimensional, but one-dimensional arrays, as well as n-dimensional arrays having more than two dimensions are other embodiments. The sensor array layer may be contained on a substrate, such as substrate 301. The substrate 301 may be any optically transmissive and insulative substrate, such as but not limited to, quartz, sapphire, glass, plastic and polymer/resins.

In an embodiment, individual sensor elements, such as sensor elements 306, 308, 316 and 318 are configured as polygons of an optically transmissive conductive material. Any material known to be transmissive over at least a portion of the wavelength band emitted by the display to be paired with the sensor array 300 may be employed for the sensor elements. In one embodiment, individual sensor elements are formed of an optically transmissive conductive material, such as, but not limited to indium tin oxide (ITO), poly(3,4-ethylenedioxythiophene) poly(styrenesulfonate) (PEDOT-PSS), carbon nanotubes, conductive ink, graphite/graphene and the like. In a further embodiment, as depicted in FIG. 3A, all sensor elements of a sensor array are formed of a same layer of optically transmissive conductive material. Using a single layer of ITO, for example, may allow the various dimensions and tolerances of the sensor array to be more readily achieved with existing manufacturing equipment.

Sensor elements of a sensor array may be coupled into either a row or a column by an interconnect, such as column interconnect 307 or row interconnect 317 in sensor array 300. The dashed lines depicted to be coincident with interconnects of the rows (e.g., 307) designate a row pitch, $P_{row}$. Similarly, dashed lines depicted coincident with interconnects of the column (e.g., 317) designate a column pitch, $P_{col}$. In particular embodiments, $P_{row}$ and $P_{col}$ are nominally 5 mm to ensure reasonable centroid calculation from a touch sensed by self- or mutual-capacitance. In certain embodiments, $P_{row}$ and $P_{col}$ are between approximately 1 mm and 7 mm.

While the row pitch and column pitch of the sensors may be on the order of millimeters, the spacing between nearest neighbor sensor elements may be significantly smaller. In a particular embodiment, the spacing, $S_2$, between nearest neighbor sensor elements is less than or equal to a pixel-mask width of a display with which the substrate 301 is to be paired to form a projected capacitance touch screen, as discussed further elsewhere herein. In one such embodiment, the spacing $S_2$ is approximately equal to a pixel-mask width of a commercially available LCD display. For example, between approximately 1 µm and 25 µm.

Figure 3B:
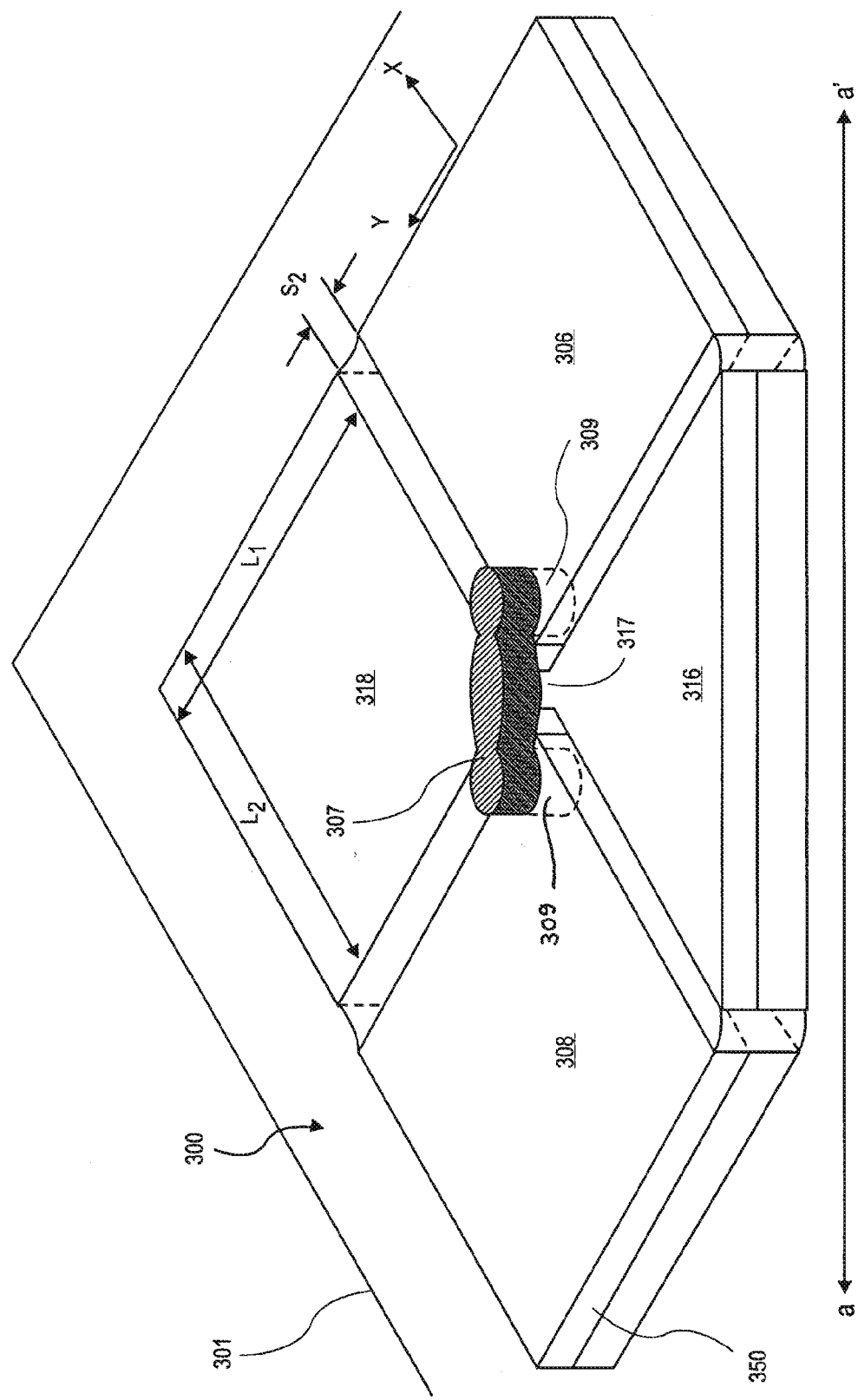
FIG. 3B illustrates an isometric view of a portion of the capacitance sensor array of FIG. 3A, in accordance with an embodiment of the present invention.

FIG. 3B depicts an isometric view along the a-a' plane of a portion 400 of the sensor array depicted in FIG. 3A. As further shown in FIG. 3B, a same layer(s) of transmissive conductive material forms all of the capacitance sensor elements of the array. For example, sensor elements 306, 308, 316 and 318 are depicted as a same layer of material. Row interconnect 317, as depicted, may be of the same layer of transmissive conductive material (e.g., indium tin oxide (ITO), conductive ink, or graphite) as that employed for the sensor elements 306, 308, 316 and 318. Column interconnect 307, disposed over the row interconnect 317 is made of a second layer of conductive material, separated from row interconnect 317 by an insulative spacer 350. The second layer of conductive material providing the column interconnect 307 may be coupled directly to the sensor elements 306 and 308 with vias 309 extending through the insulative spacer 350. In particular embodiments, row interconnect 317 is of a second optically transmissive conductive material, such as ITO formed over the first layer. In alternate embodiments however, row interconnect 317 and column interconnect 307 may be of an optically opaque conductive material, such as, but not limited to, carbon, polysilicon, aluminum, gold, silver, titanium, tungsten, tantalum, indium, tin, or copper. As discussed in further detail elsewhere herein, the presence of optically opaque interconnect may nonetheless induce few, if any, visible artifacts in the touch screen. Insulative spacer 350 may be any optically transparent insulator, such as, but not limited to silicon dioxide, silicon nitride, polymers, and the like. In one embodiment, the thickness of insulative spacer 350 is approximately 50 nanometer (nm) thick.

A single layer sensor array, as depicted in FIGS. 3A and 3B, can be challenging to utilize for capacitance sensing because the insulative spacer 350 is so thin. Because capacitance is inversely proportional to the spacing between plates of the capacitor, reducing the thickness of the insulative spacer between overlapping interconnects from a typical laminate thickness of 200 µm to the exemplary 50 nm insulative spacer 350 would increase $C_p$ by a factor of approximately 4000. However, the single layer pattern depicted in FIGS. 3A and 3B may be employed for capacitance sensing arrays in those embodiments where the spacing, $S_2$, between the sensor elements is much smaller than typical laminated structures.

Because alignment issues associated with the lamination process may be avoided when a single layer is utilized for all sensor elements, the spacing, $S_2$, may be greatly reduced. As the sensor element spacing, $S_2$, decreases, the size of the interconnects 307 and 317 decrease and therefore the area where column interconnect 307 overlaps row interconnect 317 (i.e., the "crossover" area) also decreases. The area reduction, depending on magnitude, may compensate for the capacitance increase caused by the thin insulative spacer 350 relative to a thick lamination. In this manner, $C_p$ can be made small enough for self- or mutual-capacitance sensing. For this reason it may be advantageous to make the widths of the interconnects 307 and 317 as narrow as practical, so that it is all the more advantageous to utilize a material having a lower resistance than typical optically transmissive conductors, like ITO, for at least the column interconnect 307. In one exemplary embodiment, where the spacing $S_2$ (d) is approximately 10 µm, the area (A) where column interconnect 307 overlaps row interconnect 317 becomes approximately 0.0002 mm² and the dielectric constant of the insulative spacer 350 may be approximate 4.5 (e.g., silicon dioxide). Neglecting fringing capacitance, $C_p$ for each crossover of a sensor array may be then approximated by the parallel plate relationship:

$$C = \frac{\varepsilon_0 \varepsilon_r A}{d} \quad (1)$$

or 0.16 picofarads (pF) and this is approximately the same for a typical 2-layer laminated panel.

The sensor elements of the array may be configured such that the number of sensor elements along an X-axis substantially parallel with a width dimension of the substrate containing the array remains constant across a Y-axis, extending along a height dimension of the substrate. An exemplary embodiment of such a configuration is depicted in FIG. 3A. The row axis, being defined by sensors which are electrically coupled, is rotated from the X-axis, defined to be parallel the length of the substrate 301. The column axis, substantially orthogonal to the row axis, is similarly rotated away from the height dimension of substrate 301 oriented parallel to the Y-axis, as depicted in FIG. 3A. With such an orientation of the sensor elements with respect to the substrate 301, the number of sensor elements in a sensor column differs between sensor columns (i.e., the columns are of varying lengths). For example, one column including sensor elements 306 and 308 is coupled to a column I/O 310. The column I/O 310 is therefore coupled to a column with a two-sensor length. Another column, coupled to a column I/O 305, has a length of four sensors. Similarly, the number of sensor elements in a sensor row may differ between sensor rows (i.e., the rows are of varying lengths). Indeed, certain rows or columns may have a length of one sensor (e.g., a single sensor is coupled to a signal I/O routed to sensing circuitry). In the particular embodiment depicted in FIG. 3A, both the columns and rows are variable lengths to accommodate the depicted orientation of sensor elements and consistency in the number of sensor elements with respect to the X- and Y-axes of the substrate 301. As discussed in further detail elsewhere herein, the column and row I/O extending from the rotated column and row axes of the array, respectively, are coupled to one or more drive and/or sense circuits.

In particular embodiments, each sensor element of the two-dimensional sensor array 300 is patterned into a polygon where at least one edge of the polygon is substantially parallel to a width or height of the substrate 301. In one such embodiment, the polygon is a rhombus. In another embodiment, the polygon is four sided with orthogonal sides, so that all edges of the polygon are parallel to either the width or height of the substrate 301. For example, the polygons may be squares, as depicted in FIG. 3A, or may be rectangles, depending on the edge dimensions selected (e.g., lengths $L_2$ and $L_1$ of capacitance sensor element 318). In a specific embodiment, individual sensor elements are sized based on the pixel-pitch of a display with which the sensor array 300 is to be paired, as discussed in further detail elsewhere herein. In one embodiment, the polygon side lengths $L_1$ and $L_2$ are both equal to a multiple of the pixel- or subpixel-pitch. These lengths may therefore vary considerably as a matter of design choice. However, in one exemplary embodiment, the lengths $L_1$ and $L_2$ are both equal to 54 times the pixel-pitch to span approximately 54 pixels between opposite edges of sensor element 318. Depending on the resolution of a display and the desired sensor size, a sensor element may, for example, have a side length ($L_1$ or $L_2$) between about 1 mm and approximately 7 mm, but these lengths may also be outside this range in other embodiments. In still further embodiments, the sensor elements at the perimeter edge of the array, such as capacitance sensor elements 308, 318 and 306, are a polygon of the same number of sides as a sensor element within the interior of the array, such as sensor element 316. This is in contrast to an array where perimeter sensor elements are truncated to be parallel to an edge of a substrate in a manner which reduces the number of sides and surface area of the sensor element.

Figure 4:
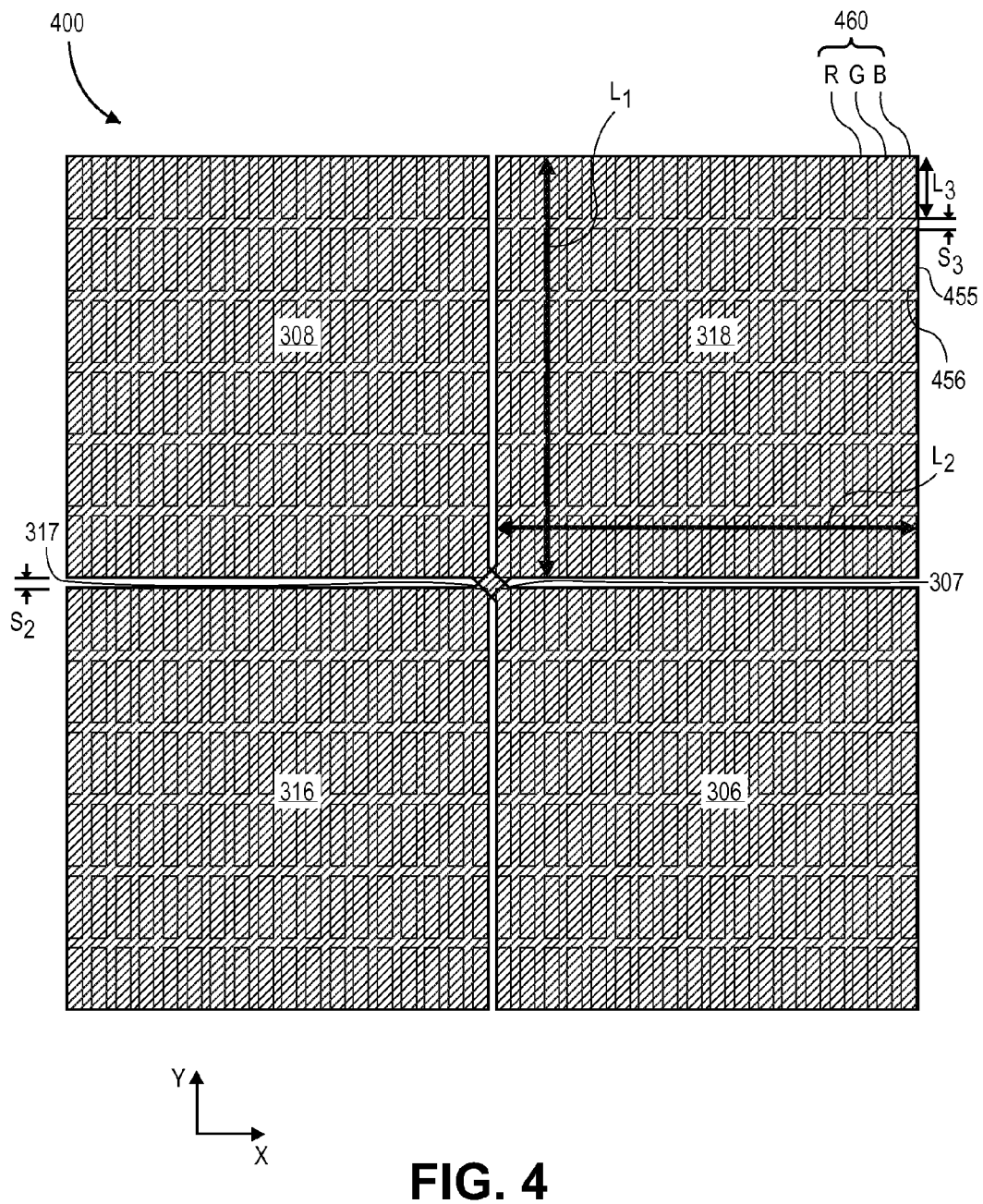
FIG. 4 illustrates a plan view of a portion of the capacitance sensor array of FIG. 3A assembled to overlay an LCD display, in accordance with an embodiment of the present invention.

FIG. 4 depicts an expanded view of a portion 400 of sensor array 300 overlaying pixels 460 of a display. Pixels 460 may be of any display technology having pixels, such as a plasma display, a cathode ray tube (CRT) or LCD. In the particular embodiment depicted, pixels 460 are RGB pixels of an LCD. As depicted, pixels 460 each have a border and may further have a sub-pixel border. Between the pixels is a dark space, which is a result of the pixel-mask. The dark space has a dimension, $S_3$, equal to the pixel-mask width. Depending on the resolution and technology of the display, pixels 460 have a particular pixel-pitch and pixel mask width, $S_3$. Also dependent on the technology of the display, pixels 460 have a particular height 455 and width (which may be a function of the sub-pixel width 456), defining the particular shape of a pixel and/or sub-pixel border. LCD structures may use a mix of pixel elements, such as squares, rectangles, stripes, etc. As a color pixel, these may exist as groups of three (RGB), four (RGBW) or other combinations of sub-pixels.

In particular embodiments, as depicted in FIG. 4, the edges of substantially all the sensor elements in the sensor array are aligned coincident with a pixel-mask so each sensor element edge (i.e., side) is substantially parallel with borders of pixels 460 (or sub-pixel borders) of the display that is paired with the two-dimensional sensor array 300. In further embodiments, the sensor array spacing $S_2$ is made to be less than or equal to the pixel-mask width $S_3$. In this manner, as shown in FIG. 4, sensor elements 308, 318, 316 and 306 form a single layer of transmissive conductive material over pixels 460 of the display. The spaces between the individual sensor elements then fall within the dark space of the pixel-mask width $S_3$, between pixels, and do not overlap the light emitting portion of any pixels. This ensures light from every pixel in the display travels through a uniform light path, including a single layer of optically transmissive conductive material. The uniform light path so provided may greatly reduce or eliminate artifacts associated with multiple light paths (i.e., having differing amounts of conductive material to pass through). Because the light from every pixel of the display passes through a single layer of conductive material, the attenuation of pixel light may be significantly less than for configurations where optical paths are through a plurality of conductive material layers.

Referring back to FIG. 3A, because the sensor elements 308, 318, 316 and 306 are aligned with the length and height dimensions of the substrate 301 (with the sensor rows and columns rotated), the substrate 301 may merely be cut to the dimensions of the display and the X and Y axes corresponding to the width and height of the substrate may then be aligned with the X and Y axes corresponding to the columns and rows of the pixels of the display. For embodiments where the sensor elements have dimensions $L_1$ and $L_2$ matched to the pixel-pitch of the display, alignment of the substrate 301 places all sensor elements 308, 318, 316 and 306 in proper position to be disposed above every pixel of the display occupying the same display area as the sensor elements. As shown in FIG. 4, such an alignment places the rectangular sensor elements 308, 318, 316 and 306 coincident with, or parallel to, the pixel mask or pixel/sub-pixel borders. Because the rows and columns of the sensor array are rotated relative to the length and height dimensions of substrate 301, when assembled, the sensor row axis is also non-parallel with the pixel row axis of the display. Similarly the sensor column axis is non-parallel with the pixel column axis of the display.

In an alternate embodiment, the substrate 301 containing the matrix of capacitance touch sensor elements 300 may be the upper substrate of the LCD itself, whereupon the pixel mask and front electrode of the LCD are actually deposited on the opposite side of the substrate 301. Since the pixel mask and sensor elements are deposited or otherwise formed on the same base substrate, they may share common references and fiducial marks to ensure alignment between the pixel mask borders and the locations of the sensor elements. Such patterning onto a common substrate eliminates an alignment step in a manufacturing process wherein a separate substrate 301 would be positioned above the pixels of the associated LCD or other display.

As further depicted in FIG. 4, the crossover of column interconnect 307 over row interconnect 317 is substantially between pixels (or sub-pixels), in the dark space of the pixel-mask. As such, whether column interconnect 307 and row interconnect 317 are of optically transmissive material or of opaque material may be of little consequence to the display quality. Thus, in particular embodiments, at least one interconnect layer, such as column interconnect 307, is of an optically opaque conductive material. A conductive material free from transparency constraints may be easier to form on the single optically transmissive conductive layer (e.g., in a single substrate process), relatively cheaper to form, and better performing (e.g., lower resistance) than optically transmissive materials.

A touch screen may further include a number of additional layers or substrates beyond the display layer and the sensor array layer depicted in FIG. 4. For example, a touch screen may further include any mix of glass, polymer, and polarizer layers over the display layer and/or the sensor array layer and may further include circuitry layers containing drive circuitry, sensing circuitry and various other signal filtering, conditioning, multiplexing and demultiplexing circuitry. Alternatively, any such circuitry may be contained in or mounted on the sensor array layer, as a design choice. A touch screen may further include a protective cover sheet, which may be coated to provide a low friction and scratch preventive surface. A touch screen may further include a variety of adhesive layers to bond functional layers into a strong laminate. The adhesive layer(s) may be optically transmissive glue having a refractive index matched to reduce the light loss and effect of topographical variations on the final image quality of the touch screen.

Figure 5:
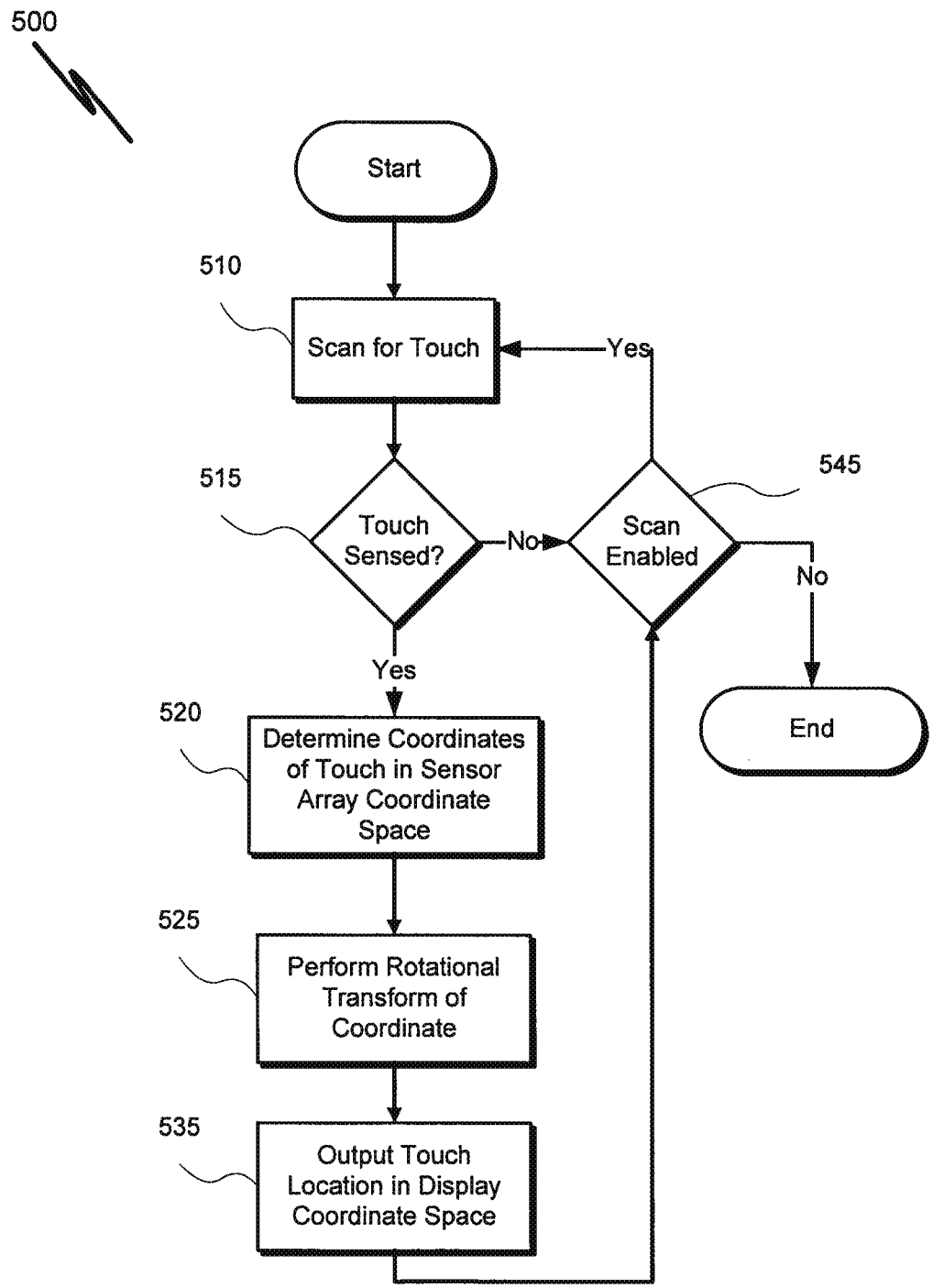
FIG. 5 is a flowchart representing a series of operations for determining location on a display corresponding to a touch sensed by a capacitance sensor array configured in accordance with an embodiment of the present invention.

In another aspect of the present invention, the touch screen employing the display and sensor layers depicted in FIG. 4 is operated to determine display coordinates of a touch sensed at coordinates of the capacitance sensor array. FIG. 5 depicts a Flowchart 500 representing a series of exemplary operations for performing a particular computer implemented method to determine such display coordinates.

The computer implemented method 500 begins with operation 510, where sensor circuitry coupled to the sensor array of the touch screen via row and/or column I/O begins scanning the rows and/or columns for a change in capacitance indicative of a touch. Depending on the embodiment, the sensor array 300 of FIG. 3A, when paired with a display screen, as depicted in FIG. 4, may be configured for self capacitance sensing or mutual capacitance sensing or any other sensing method known in the art.

Generally, for self capacitance sensing the sensor elements within each row or column are coupled together and operate as one sensor element. The columns and rows of sensor elements form a grid array with each element representing a different column, row coordinate in the sensor array coordinate space. The center of each row provides a reference location used in calculation of the Y-axis portion of a coordinate on the screen, and the center of each column provides a reference location used in calculation of the X-axis portion of the coordinate. At operation 510, the capacitive sensing circuit monitors changes in capacitance that occur as sensed from each row and/or column I/O. Capacitance measurements may be performed by any method known in the art. For example, a sensor may be charged and then discharged to measure the charge stored on the sensor. As the capacitance increases when a finger is present, more charge can be stored by the charging process allowing more charge to be measured in the discharge process. This measurement process may be repeated for each row or column until all rows or columns are sampled, at which point the measured results are evaluated for the presence of a touch at operation 515.

In an alternative embodiment, where the sensor array 300 is configured for mutual-capacitance sensing, either the columns or rows of sensor elements are driven by a drive circuitry while the approximately orthogonal columns or rows are coupled to a sensing circuitry. The crossover points between the rows and columns form a capacitively-coupled node having a unique column, row coordinate in the sensor array coordinate space. Each driven row or column is electrically coupled to an AC voltage source. During operation 510, charge is driven into one driven line at a time, and through the mutual capacitance at the crossovers, some portion of the charge is passed to the sensor elements of the opposite axis where it may be measured. At operation 510, the sensing circuit measures each sensor intersection for mutual capacitance in a manner similar to that described for self-capacitance sensing embodiments.

At operation 515 the presence of one or more touch events is determined by comparison of the measured charge to a previously determined non-touch baseline level for each sensor or sensor intersection. For either self- or mutual-capacitance sensing, analysis of the magnitude of change in capacitance at the sensor column, row, or intersection where a capacitance change occurs, may identify one or more touch events. If no touch event is detected (515) and scanning remains enabled (545), the scan operation 510 is repeated. If a touch event is detected, processing continues at operation 520. At operation 520, the coordinates, in the sensor array space, of the one or more sensed touches are determined. This coordinate determination may be done by any method known in the art, for example by a centroid calculation.

With the coordinates within the sensor array determined, the coordinates are then transformed at operation 525 into the coordinate space of the display screen for correlation with location specific interface information displayed on the display screen. In particular embodiments, operation 525 includes a rotational transform to convert each coordinate determined in the coordinate space of the sensor array to a coordinate in the display screen coordinate space. For example, as shown in FIG. 3A, the rows and columns of the sensor array 300 are rotated and offset relative the X-axis and Y-axis defining the width and height of the substrate 301, respectively. Upon pairing of the substrate 301 with a display screen to have the substrate 301 X-axis aligned with pixel rows of the display and the substrate 301 Y-axis aligned with pixel columns of the display, the rows and columns of the sensor array 300 are rotated relative to the row and column coordinates of the display pixels. A rotational transform of the received coordinates (e.g., representing calculated row and column location in the sensor array) may be performed based on a relationship between the orientation of the display screen and the orientation of the capacitance sensor array to map the sensor coordinates determined to have a touch event to display coordinates. In a particular embodiment, the rotational transform is an angular math transform between the sensor array coordinate space and the display coordinate space. This transform can be very accurately applied knowing the layouts and dimensions of both the sensor array and display given the alignment tolerance between the display layer and single sensor array layer may be made very small. In particular embodiments, operation 525 may further include a scaling and offset correction of the sensor coordinate(s). With the display coordinates corresponding to one or more touch events determined by the rotational transform, the location of one or more touch events may be output at operation 535 to a downstream processing module. If scanning remains enabled, as validated by operation 545, the panel is scanned again for touches at operation 510. If the controlling system has determined that scanning is no longer enabled, the method 500 completes.

Some portions of the detailed descriptions provide herein are presented in terms of algorithms and symbolic representations of operations on data bits within a computer memory. Unless specifically stated otherwise, as apparent from the following discussion, it is appreciated that throughout the description, discussions utilizing terms such as "calculating," "determining," "estimating," "storing," "collecting," "displaying," "receiving," "consolidating," "generating," "updating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure may be provided in whole or in part as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Figure 6:
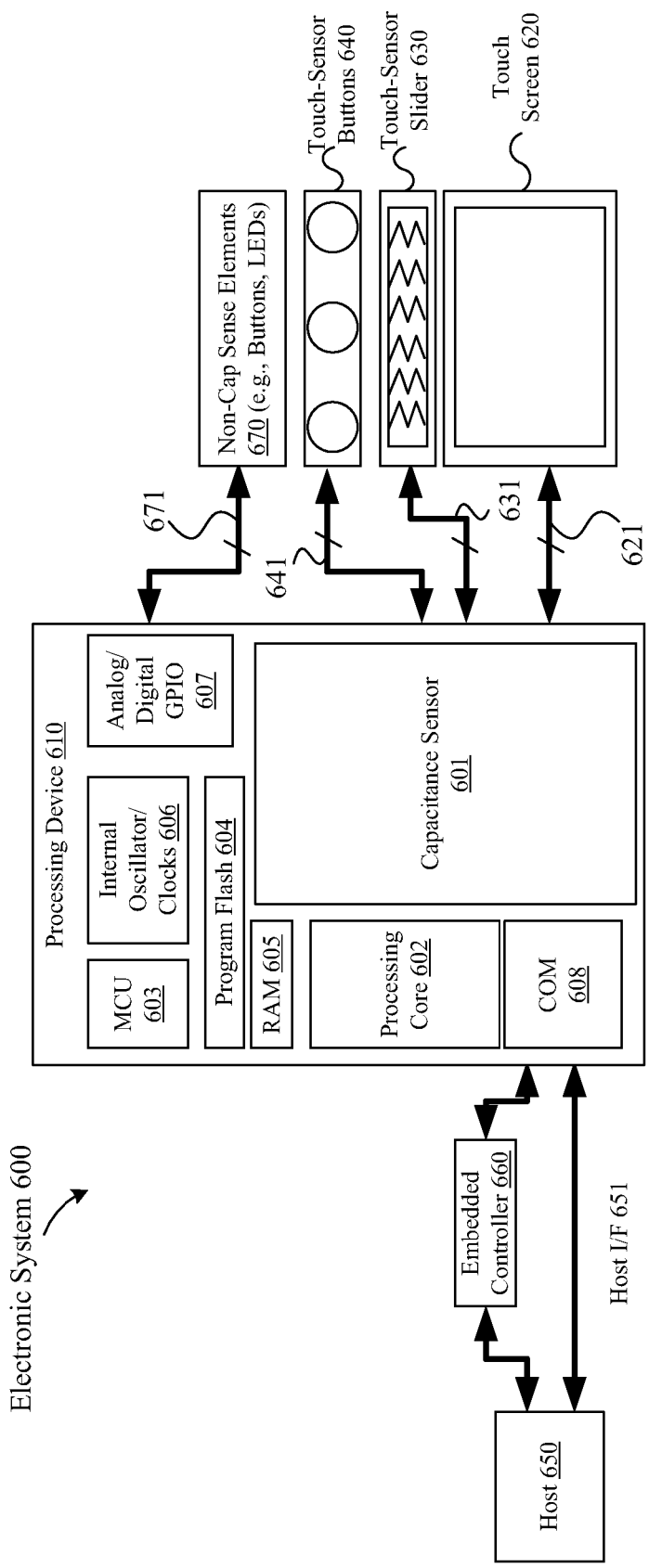
FIG. 6 illustrates a block diagram of an electronic system having a processing device for detecting a presence of a conductive object on a touch screen, in accordance with an embodiment of the present invention.

FIG. 6 illustrates a block diagram of an exemplary electronic system having a processing device for detecting a presence of a touch on a touch-sensor, in accordance with an embodiment of the present invention. Electronic system 600 includes processing device 610, touch screen 620, touch-sensor slider 630, touch-sensor buttons 640, host processor 650, embedded controller 660, and non-capacitance sensor elements 670. The processing device 610 may include analog and/or digital general purpose input/output ("GPIO") ports 607. GPIO ports 607 may be programmable. GPIO ports 607 may be coupled to a Programmable Interconnect and Logic ("PIL"), which acts as an interconnect between GPIO ports 607 and a digital block array of the processing device 610 (not illustrated). The digital block array may be configured to implement a variety of digital logic circuits (e.g., DAC, digital filters, digital control systems) using, in one embodiment, configurable user modules ("UMs"). The digital block array may be coupled to a system bus (not illustrated). Processing device 610 may also include memory, such as random access memory (RAM) 605 and program flash memory 604. RAM 605 may be static RAM (SRAM) or the like, and program flash memory 604 may be a non-volatile storage, or the like, which may be used to store firmware (e.g., control algorithms executable by processing core 602 to implement operations described herein). Processing device 610 may also include a memory controller unit (MCU) 603 coupled to program flash memory 604 or RAM 605 and the processing core 602.

The program flash memory 604 may also be used to store methods that perform rotational transforms between a sensor array coordinate space and a display pixel row and column coordinate space. The program flash memory 604 may be programmed via a machine-accessible storage medium. The term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

As illustrated, capacitance sensor 601 may be integrated into processing device 610. Capacitance sensor 601 may include analog I/O for coupling to an external component, such as touch screen 620, touch-sensor slider 630, touch-sensor buttons 640, or other devices. Capacitance sensor 601 and processing device 610 are described in more detail below.

It should be noted that the embodiments described herein are not limited to touch-sensor elements for mobile computing implementations, but can be used in other capacitive sensing implementations, for example, the sensing device may be a touch-sensor slider 630, or a touch-sensor button 640 (e.g., capacitance sensing button). It should also be noted that the embodiments described herein may be implemented in sensing technologies other than capacitive sensing, such as resistive, optical imaging, surface acoustical wave (SAW), infrared, dispersive signal, and strain gauge technologies. Similarly, the operations described herein are not limited to pointer operations, but can include other operations, such as lighting control (dimmer), temperature or environmental control, volume control, graphic equalizer control, speed control, or other control operations requiring gradual or discrete adjustments.

In one embodiment, the electronic system 600 includes a touch screen 620 coupled to the processing device 610 via bus 621. Touch screen 620 may include a panel having an array of capacitance sensors arranged to provide a single layer of conductive material over every pixel in the display, as described in embodiments above. In one embodiment, the sensor elements of the sensor array are capacitance sensor elements.

The electronic system 600 may include any combination of one or more of touch screen 620, touch-sensor slider 630, or touch-sensor button 640. In another embodiment, the electronic system 600 also includes non-capacitance sensor elements 670 coupled to the processing device 610 via bus 671. The non-capacitance sensor elements 670 may include buttons, light emitting diodes (LEDs), and other user interface devices, such as a mouse, a keyboard, a display, or other functional keys that do not use capacitance sensing. In one embodiment, buses 671, 641, 631, and 621 are a single interconnect. Alternatively, these buses may be configured into any combination of one or more separate buses.

Processing device 610 may include internal oscillator/clocks 606 and communication block 608. The oscillator/clocks block 606 provides clock signals to one or more of the components of processing device 610. Communication block 608 may be used to communicate with an external component, such as a host processor 650, via host interface (I/F) 651. Alternatively, processing device 610 may also be coupled to embedded controller 660 to communicate with the external components, such as host processor 650. Interfacing to the host processor 650 can be through various methods. In one exemplary embodiment, interfacing with the host processor 650 is done using a standard PS/2 interface to connect to an embedded controller 660, which in turn sends data to the host processor 650 via a low pin count (LPC) interface. In some instances, it may be beneficial for the processing device 610 to do both touch-sensor and keyboard control operations, thereby freeing up the embedded controller 660 for other housekeeping functions. In another exemplary embodiment, interfacing is done using a universal serial bus (USB) interface directly coupled to the host processor 650 via host interface 651. Alternatively, the processing device 610 may communicate to external components, such as the host processor 650, using industry standard interfaces, such as USB, PS/2, inter-integrated circuit (I2C) bus, or system packet interfaces (SPI). The host processor 650 and/or embedded controller 660 may be coupled to the processing device 610 with a ribbon or flex cable from an assembly, which houses the sensing device and processing device.

In one embodiment, the processing device 610 is configured to communicate with the embedded controller 660 or the host processor 650 to send and/or receive data. The data may be a command or alternatively a signal. In an exemplary embodiment, the electronic system 600 operates in both standard-mouse compatible and enhanced modes. The standard-mouse compatible mode utilizes the HID class drivers already built into the Operating System (OS) software of host processor 650. These drivers enable the processing device 610 and sensing device to operate as a standard pointer control user interface device, such as a two-button PS/2 mouse. The enhanced mode may enable additional features such as scrolling or disabling the sensing device, such as when a mouse is plugged into the notebook. Alternatively, the processing device 610 may be configured to communicate with the embedded controller 660 or the host processor 650, using non-OS drivers, such as dedicated touch-sensor pad drivers, or other drivers known by those of ordinary skill in the art.

Processing device 610 may reside on a common carrier substrate such as, for example, an integrated circuit (IC) die substrate, a multi-chip module substrate, or the like. Alternatively, the components of processing device 610 may be one or more separate integrated circuits and/or discrete components. In one exemplary embodiment, processing device 610 is a Programmable System on a Chip (PSoC®) device, manufactured by Cypress Semiconductor Corporation, San Jose, Calif. Alternatively, processing device 610 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or the like. In an alternative embodiment, for example, the processing device is a network processor having multiple processors including a core unit and multiple micro-engines. Additionally, the processing device may include any combination of general-purpose processing device(s) and special-purpose processing device(s).

Embodiments of the method and apparatus described herein may be implemented in a fully self-contained touch screen which outputs fully processed X/Y movement and gesture data signals or data commands to a host. The method and apparatus may also be implemented in a mode which outputs X/Y movement data and also finger presence data to a host, and where the host processes the received data to detect gestures. The method and apparatus may also be implemented in mode which outputs raw capacitance data to a host, where the host processes the capacitance data to compensate for quiescent and stray capacitance, and calculates X/Y movement and detects gestures by processing the capacitance data. Alternatively, the method and apparatus may be implemented in a mode which outputs pre-processed capacitance data to a host, where the touchpad processes the capacitance data to compensate for quiescent and stray capacitance, and the host calculates X/Y movement and detects gestures from the pre-processed capacitance data.

The electronic system that includes the embodiments described herein may be implemented in a mobile handset (e.g., cellular or mobile phone) or other electronic devices where the touch screen may operate either as a touch-sensor pad for x/y positioning and gesture recognition, or as a keypad or other arrays of touch-sensor buttons and/or sliders. Alternatively, the touch screen, although configured to operate in the two modes, may be configured to be used only as a keypad, or only as a touch-sensor. Alternatively, the electronic device may be used in other applications, such as a personal data assistant (PDA), a kiosk, a keyboard, a television, a remote control, a monitor, a handheld multi-media device, a handheld video player, a handheld gaming device, or a control panel.

Capacitance sensor 601 may be integrated into the processing device 610, or alternatively, in a separate IC. Alternatively, descriptions of capacitance sensor 601 may be generated and compiled for incorporation into other integrated circuits. For example, behavioral level code describing capacitance sensor 601, or portions thereof, may be generated using a hardware description language, such as VHDL or Verilog, and stored to a machine-accessible medium (e.g., Flash ROM, CD-ROM, hard disk, floppy disk, or the like). Furthermore, the behavioral level code can be compiled into register transfer level ("RTL") code, a netlist, or even a circuit layout and stored to a machine-accessible medium. The behavioral level code, the RTL code, the netlist, and the circuit layout all represent various levels of abstraction to describe capacitance sensor 601.

In one embodiment, capacitance sensor 601 is a capacitive sense relaxation oscillator (CSR). The CSR may include a current-programmable relaxation oscillator, an analog multiplexer, digital counting functions, and high-level software routines to compensate for environmental and physical sensor element variations.

It should be noted that there are various known methods for measuring capacitance. Although some embodiments described herein are described using a relaxation oscillator, the present embodiments are not limited to using relaxation oscillators, but may include other methods, such as current versus voltage phase shift measurement, resistor-capacitor charge timing, capacitive bridge divider, charge transfer, sigma-delta modulators, charge-accumulation circuits, or the like.

The current versus voltage phase shift measurement may include driving the capacitance through a fixed-value resistor to yield voltage and current waveforms that are out of phase by a predictable amount. The drive frequency can be adjusted to keep the phase measurement in a readily measured range. The resistor-capacitor charge timing may include charging the capacitor through a fixed resistor and measuring timing on the voltage ramp. Small capacitance values may use very large resistors for reasonable timing. The capacitive bridge divider may include driving the capacitor under test through a fixed reference capacitor. The reference capacitor and the capacitor under test form a voltage divider. The voltage signal may be recovered with a synchronous demodulator, which may be done in the processing device 610. The charge transfer may be conceptually similar to an R-C charging circuit. In this method, $C_P$ is the capacitance being sensed. $C_{SUM}$ is the summing capacitor, into which charge is transferred on successive cycles. At the start of the measurement cycle, the voltage on $C_{SUM}$ is discharged. The voltage on $C_{SUM}$ increases exponentially (and only slightly) with each clock cycle. The time for this voltage to reach a specific threshold is measured with a counter.

Thus, a touch screen including sensor elements disposed over a display such that a single layer of optically transmissive conductive material is positioned over each pixel of the display has been described. Although the present disclosure has been described in language specific to structural features or methodological acts, it is to be understood that the invention defined in the appended claims is not necessarily limited to the specific features or acts described. The specific features and acts disclosed are to be understood merely as particularly graceful implementations of the claimed invention provided in an effort to illustrate rather than limit the present disclosure.

What is claimed is:

1. A touch screen, comprising:
a display comprising a plurality of pixels, each pixel comprising a light-emitting portion and a non-light-emitting portion;
a sensor array coupled to sensor circuitry, the sensor array disposed over the display such that a single layer of conductive, optically transmissive material is positioned over substantially all of the plurality of pixels of the display, wherein the sensor array comprises a plurality of sensor elements disposed over the plurality of pixels and a plurality of electrical interconnects configured to couple at least two of the plurality of sensor elements together, each of the plurality of electrical interconnects extending between adjacent sensor elements of the plurality of sensor elements such that each interconnect extends between two pixels located diagonally from each other and within a non-light-emitting portion of a pixel in the plurality of pixels,
wherein substantially all the sensor elements are coupled together to form at least two axes including a row axis and a column axis,
the sensor element row axis is non-parallel with a pixel row axis of the display,
the sensor element column axis is non-parallel with a pixel column axis of the display, and
wherein a space between an edge of a first sensor element, in a first dimension of the array, adjacent to an edge of a second sensor element, in a second dimension of the array, has a width less than or equal to a pixel-mask width of the display; and
a first electrical interconnect between the first sensor element and a third sensor element, in the first dimension of the array, wherein the first and third sensor elements and first electrical interconnect comprise a same layer of optically transmissive conductive material.

2. The touch screen of claim 1, wherein the number of sensor elements in a row differs between the rows.

3. The touch screen as in claim 1, wherein the sensor elements have dimensions that are a multiple of the pixel-pitch of the display.

4. The touch screen as in claim 1, wherein the sensor array is of a same layer of optically transmissive conductive material comprising at least one of: ITO, PEDOT, conductive ink, and graphite.

5. The touch screen as in claim 1, wherein the first sensor element edge is parallel to a sub-pixel border of the display.

6. The touch screen as in claim 1, further comprising a second electrical interconnect between the second sensor element and a fourth sensor element, in the second dimension of the array, wherein the second electrical interconnect comprises an optically opaque material.

7. A touch screen substrate, comprising:
an array of pixels, each pixel comprising a light-emitting portion and a non-light-emitting portion;
an n-dimensional sensor array coupled to the pixels and including sensor elements and a plurality of electrical interconnects between sensor elements, wherein:
all of the sensor elements are coupled together to form at least two axes including a row axis and a column axis,
the number of sensor elements in a row differs between the rows,
all edges of the sensor elements are substantially parallel to edges of the pixels,
the row axis and the column axis are non-parallel to the edges of the pixels,
the row axis of the sensor elements is non-parallel with a pixel row axis of the display,
the column axis of the sensor elements is non-parallel with a pixel column axis of the display,
the number of sensor elements are disposed over the pixels, and each of the plurality of electrical interconnects extends between adjacent sensor elements such that each interconnect extends between two pixels located diagonally from each other and within a non-light-emitting portion of a pixel in the array of pixels,
wherein a space between an edge of a first sensor element, in a first dimension of the array, adjacent to an edge of a second sensor element, in a second dimension of the array, has a width less than or equal to a pixel-mask width of the display; and
a first electrical interconnect between the first sensor element and a third sensor element, in the first dimension of the array, wherein the first and third sensor elements and first electrical interconnect comprise a same layer of optically transmissive conductive material.

8. The touch screen substrate as in claim 7, wherein the number of sensor elements in a column differs between the columns.

9. The touch screen substrate as in claim 7, wherein each sensor element comprises an optically transmissive conductive material patterned into a polygon, and wherein at least one side of the polygon is substantially parallel or perpendicular to a length of the substrate.

10. The touch screen substrate as in claim 9, wherein each of the sensor elements is a rectangle.

11. The touch screen substrate as in claim 7, wherein the sensor elements at the perimeter edge of the array are a polygon of the same number of sides as the sensor elements within the interior of the array.

12. The touch screen substrate as in claim 7, wherein the sensor elements in a first row of the array have a pitch greater than 1 mm and a first sensor element of the first row is spaced apart from a nearest neighboring sensor element by less than 25 µm.

13. The touch screen substrate as in claim 7, wherein all the sensor elements of the array are of a same layer of optically transmissive conductive material comprising at least one of ITO, PEDOT, conductive ink, and graphite and wherein the sensor elements within at least one of a row or a column are coupled together with an optically opaque conductive material.

14. A method for determining a location of a touch on a touch sensitive display screen having a plurality of pixels, each pixel comprising a light-emitting portion and a non-light-emitting portion, the method comprising:
receiving a coordinate of a capacitance sensor array representing a location of a sensed touch, wherein:
the capacitance sensor array comprises a plurality of sensor elements and a plurality of electrical interconnects,
the plurality of sensor elements disposed over the plurality of pixels and coupled together to form at least two axes including a row axis and a column axis and the row axis and the column axis are non-parallel to the edges of the pixels of the display screen,
the sensor element row axis is non-parallel with a pixel row axis of the display,
the sensor element column axis is nonparallel with a pixel column axis of the display,
each of the plurality of electrical interconnects extending between adjacent sensor elements of the plurality of sensor elements such that each interconnect extends between two pixels located diagonally from each other and within a non-light-emitting portion of a pixel of the plurality of pixels of the display screen; and
determining a coordinate of the display screen corresponding to the sensed touch by performing a rotational transform of the received coordinate based on a relationship between the orientation of the display screen and the orientation of the capacitance sensor array.

15. The method as in claim 14, wherein the rotation transform is an angular math transform between a sensor array coordinate space and a display coordinate space.

16. The method as in claim 14, wherein the rotational transform is a transform between a sensor element row-column coordinate system of the sensor array and a pixel row-column coordinate system of the display.

* * * * *